United States Patent
Ericson et al.

(10) Patent No.: US 9,295,020 B2
(45) Date of Patent: Mar. 22, 2016

(54) SYSTEMS AND METHODS REGISTRATION AND MAINTENANCE OF WIRELESS CLIENTS VIA A PROXY WIRELESS NETWORK SERVICE

(75) Inventors: Daniel W. Ericson, Hollis, NH (US); Thomas A. Hengeveld, Hollis, NH (US)

(73) Assignee: Harris Corporation, Melbourne, FL (US)

( * ) Notice: Subject to any disclaimer, the term of this patent is extended or adjusted under 35 U.S.C. 154(b) by 225 days.

(21) Appl. No.: 13/429,970

(22) Filed: Mar. 26, 2012

(65) Prior Publication Data

US 2013/0250783 A1    Sep. 26, 2013

(51) Int. Cl.
*H04L 12/26* (2006.01)
*H04W 60/00* (2009.01)
*H04W 36/30* (2009.01)
*H04W 88/06* (2009.01)

(52) U.S. Cl.
CPC ............ *H04W 60/005* (2013.01); *H04W 36/30* (2013.01); *H04W 88/06* (2013.01); *Y02B 60/50* (2013.01)

(58) Field of Classification Search
USPC .......... 370/331, 332, 334, 254; 455/436, 442, 455/44, 331, 332, 334, 254
See application file for complete search history.

(56) References Cited

U.S. PATENT DOCUMENTS

| | | | |
|---|---|---|---|
| 7,408,948 B2 * | 8/2008 | Lopponen et al. | 370/433 |
| 8,072,936 B2 * | 12/2011 | Shaheen | 370/331 |
| 8,125,939 B2 * | 2/2012 | Murasawa et al. | 370/315 |
| 8,155,116 B2 * | 4/2012 | Eriksson et al. | 370/389 |
| 8,229,812 B2 * | 7/2012 | Raleigh | 705/34 |
| 8,510,551 B1 * | 8/2013 | Desai et al. | 713/163 |
| 8,547,912 B1 * | 10/2013 | Breau et al. | 370/329 |

(Continued)

FOREIGN PATENT DOCUMENTS

| | | |
|---|---|---|
| EP | 2 200 365 A1 | 6/2010 |
| WO | 2010 094319 A1 | 8/2010 |

OTHER PUBLICATIONS

Budka, K., et al., "Public Safety Mission Critical Voice Services Over LTE", Bell Lbas Technical Journal, Wile, CA US, vol. 16. No. 3, Dec. 1, 2011 pp. 133-149.

(Continued)

*Primary Examiner* — Ian N Moore
*Assistant Examiner* — Phong La
(74) *Attorney, Agent, or Firm* — Fox Rothschild, LLP; Robert J. Sacco; Carol E. Thorstad-Forsyth

(57) ABSTRACT

A method for registration and maintenance of a data connection using a proxy wireless network service involves registering a multi-network terminal on a first network that is made up of a first network infrastructure. The method includes transmitting registration information for a second network to a proxy component that is part of the first network infrastructure. The transmission of the registration information causes the proxy component to forward said registration information to an agent component that is part of the second network that is made up of a second network infrastructure. The method also includes receiving a registered service from the second network based on the registration information that was transmitted to the first network infrastructure. The method also includes transmitting a message to the second network and receiving the registered service from the second network in response to the message.

20 Claims, 6 Drawing Sheets

(56) References Cited

U.S. PATENT DOCUMENTS

| | | |
|---|---|---|
| 2004/0087307 A1* | 5/2004 | Ibe et al. ................ 455/436 |
| 2006/0072517 A1 | 4/2006 | Barrow et al. |
| 2006/0116127 A1* | 6/2006 | Wilhoite et al. ............ 455/442 |
| 2007/0146475 A1* | 6/2007 | Inoue ................... 348/14.01 |
| 2007/0211694 A1* | 9/2007 | Rasanen .................... 370/352 |
| 2007/0217363 A1* | 9/2007 | Ue et al. .................... 370/331 |
| 2007/0254661 A1* | 11/2007 | Chowdhury et al. ......... 455/436 |
| 2008/0077789 A1* | 3/2008 | Gondo ...................... 713/155 |
| 2008/0092224 A1* | 4/2008 | Coulas et al. ................ 726/12 |
| 2008/0123596 A1* | 5/2008 | Gallagher et al. ........... 370/331 |
| 2008/0137612 A1* | 6/2008 | Gallagher et al. ........... 370/331 |
| 2008/0216167 A1* | 9/2008 | Imai et al. ................... 726/12 |
| 2008/0304451 A1* | 12/2008 | Thompson .................. 370/331 |
| 2009/0170519 A1* | 7/2009 | Wilhoite et al. ............. 455/436 |
| 2010/0008259 A1* | 1/2010 | Yoon et al. .................. 370/254 |
| 2010/0195621 A1* | 8/2010 | Kekki et al. ................. 370/332 |
| 2010/0217980 A1* | 8/2010 | Komorita et al. ............ 713/168 |
| 2010/0238903 A1* | 9/2010 | Kitazoe ...................... 370/332 |
| 2011/0002295 A1* | 1/2011 | Ghosal et al. ................ 370/331 |
| 2011/0213871 A1* | 9/2011 | DiGirolamo ............ H04W 4/00 709/223 |
| 2011/0250893 A1* | 10/2011 | Lee et al. .................... 455/437 |
| 2011/0317550 A1* | 12/2011 | Tanigawa ............. H04W 24/08 370/225 |
| 2012/0028646 A1* | 2/2012 | Ibe et al. ..................... 455/445 |
| 2012/0149421 A1 | 6/2012 | Korus et al. |
| 2012/0218889 A1* | 8/2012 | Watfa et al. ................. 370/230 |
| 2012/0224528 A1* | 9/2012 | Tapia et al. ................. 370/328 |
| 2012/0250659 A1* | 10/2012 | Sambhwani ................ 370/332 |
| 2012/0270546 A1* | 10/2012 | Yoon et al. ............... 455/435.1 |
| 2013/0128865 A1* | 5/2013 | Wu et al. .................... 370/331 |
| 2013/0144954 A1* | 6/2013 | Li et al. ...................... 709/205 |
| 2013/0223409 A1* | 8/2013 | Jung et al. .................. 370/331 |
| 2013/0301501 A1* | 11/2013 | Olvera-Hernandez et al. ......................... 370/311 |
| 2013/0303088 A1* | 11/2013 | Watfa et al. ................. 455/41.2 |

OTHER PUBLICATIONS

Taaghol, P., et al., "Seamless Integration of Mobile WiMax in 3GPP Networks", IEEE Communications Magazine, IEEE Service Center, Piscataway, US, vol. 46, No. 10, Oct. 1, 2008, pp. 74-85.

International Search Report and Written Opinion mailed Aug. 5, 2013, Application Serial No. PCT/US2013/033431 in the name of Harris Corporation.

* cited by examiner

SYSTEMS AND METHODS REGISTRATION AND MAINTENANCE OF WIRELESS CLIENTS VIA A PROXY WIRELESS NETWORK SERVICE

BACKGROUND OF THE INVENTION

1. Statement of the Technical Field

The invention concerns registration of wireless clients through the use of a proxy service, and more particularly the registration and maintenance of data connections to one network through the use of a proxy service on a preferred network.

2. Description of the Related Art

There are various communication networks known in the art. Such communication networks include Land Mobile Radio (LMR) networks, Wideband Code Division Multiple Access (WCDMA) based networks, Code Division Multiple Access (CDMA) based networks, Wireless Local Area Networks (WLANs), Global System for Mobile communications (GSM) based networks, Enhanced Data rates for GSM Evolution (EDGE) based networks and Long Term Evolution (LTE) based networks. Each of these communication networks comprises a plurality of communication devices and network equipment configured to facilitate communications between the communication devices.

Each communications network operates according to a communications protocol that dictates message formats and procedures for exchanging messages within the communications system and is often governed by industry standards. Such protocols and standards include GSM, the Universal Mobile Telecommunications System (UMTS), and the Long Term Evolution (LTE) or LTE Advanced (LTE-A) standards promulgated by the Third Generation Partnership Project (3GPP). Other protocols include the CDMAOne and CDMA2000 protocols, the Institute of Electrical and Electronics Engineers (IEEE) 802 family of protocols; the Project 25 (P25) and other LMR protocols, and the like. Among the many procedures defined by a network protocol is the registration procedure that allows a communications device to establish a link to the communications network and receive services via the communications network. This process is alternatively called "attachment."

The transmission of data in a communications system can be divided into distinct operations. These operations are generally conceptualized into "data plane" functions and "control plane" functions. The data plane carries user data traffic transmitted in accordance with the appropriate protocol for the communications system. The control plane exists to support the data plane, and functions to establish (e.g. register or attach to the network), maintain, and modify the data connection used by the data traffic in accordance with the appropriate protocol for the communications system. For example, current technology requires that control plane messaging establish a data connection between a terminal and a network system. Once the data connection is established, data plane messages exchange data between the terminal and other parts of the network system.

Portable multi-network communications devices which maintain connections to multiple communications networks can rapidly deplete battery power when performing registration and connectivity management tasks independently on each network. These devices would benefit from mechanisms that minimize this registration and maintenance activity without affecting application response times.

SUMMARY OF THE INVENTION

Embodiments of the present invention concern a method for use in a wireless multi-network terminal registered on a first network that includes a first network infrastructure. The method includes transmitting registration information for a second network to a proxy component that is in communication with the first network infrastructure. The transmission of the registration information causes the proxy component to forward said registration information to an agent component that is part of the second network that includes second network infrastructure. The method also includes receiving a registered service from the second network based on the registration information that was transmitted to the first network infrastructure.

Other embodiments of the present invention concern a multi-network terminal configured to communicate with multiple networks. The multi-network terminal includes a controller configured to generate registration messages compatible with a first network. The registration messages include registration information for use with a second network. The multi-network terminal further includes a transmitter and associated circuitry configured to transmit the messages to a proxy component that is in communication with a network infrastructure that makes up the first network. The messages cause the proxy component to forward the registration information to an agent component that is part of a second network infrastructure that makes up the second network. The wireless network terminal includes a receiver and associated circuitry configured to receive a registered service from the second network based on the registration information that was transmitted to the first network infrastructure.

A method for use in the system includes registering a multi-network terminal on a first network using a first network infrastructure. The method continues with the multi-network terminal transmitting additional registration information to the proxy component, such additional registration information being suitable for registration with a second network. The proxy component receives the additional registration information to be used to register the multi-network terminal on a second network. The proxy component then forwards the additional registration information to an agent component that is part of a second network infrastructure. The agent component forwards the additional registration information of the multi-network terminal to a site agent located within the second network infrastructure. The multi-network terminal is then registered by the site agent on the second network by using the additional registration information forwarded from the first network infrastructure.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
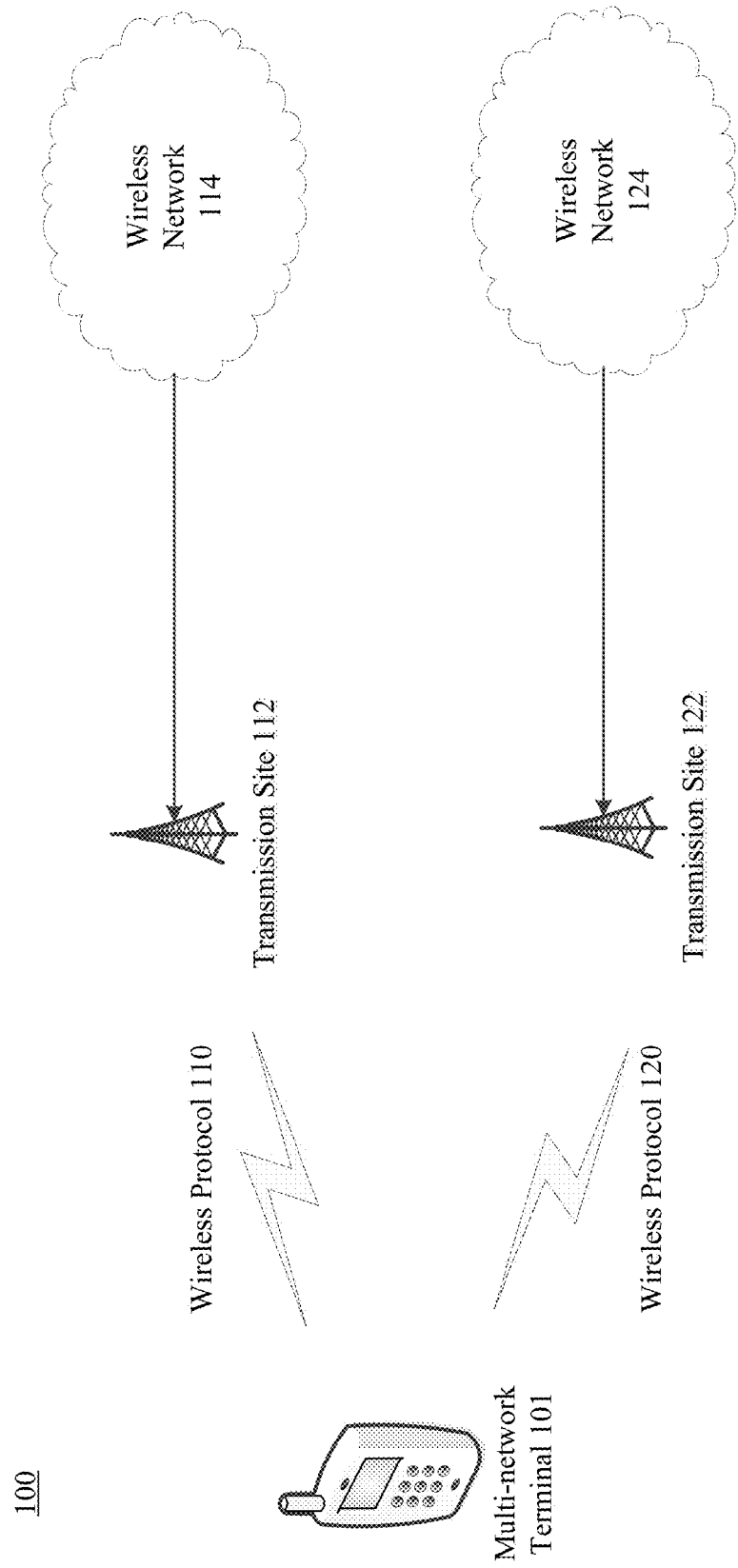
FIG. 1 is a diagram of a multi-network communication system that is useful for understanding the embodiments of the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

As used herein, the term "multi-network terminal" means any portable communication device capable of communicating with two or more networks. As such, a multi-network terminal can be a land mobile radio ("LMR"), mobile/smart phone, personal computer ("PC"), notebook, a laptop computer, a PDA, a tablet, or other portable multi-network communication device.

As used herein, the term "proxy component" means a network apparatus within and/or in communication with the network infrastructure of a first network that is capable of serving as a proxy for a second network, or a like component outside of the first network but in communication with the fixed network that is likewise capable of serving as a proxy for a second network. The proxy component receives, processes, and forwards information bound for the second network sent from a multi-network terminal connected to the first network. The proxy component may be implemented in hardware or in software.

As used herein, the term "agent component" means a network apparatus that is capable of serving as an agent in a second network for a multi-network terminal connected to a first network. The agent component is within and/or in communication with the second network. The agent component receives, processes, and forwards information transmitted from a proxy component in the first network. The agent component may be implemented in hardware or software.

As used herein, the term "transmission site" means any access point, base station, or other network apparatus capable of communication with multi-network terminals. Although transmission sites for individual networks are described herein as distinct, one skilled in the art would recognize that the same transmission site may service multiple networks simultaneously. As used herein, the phrase "located at a transmission site" means any network component that may be described as part of the transmission site, whether physically or logically. Additionally, the term "transmission site" is not limited to a single network apparatus, but may include several networked apparatus that need not be geographically co-located.

Systems implementing network radio access technology often require transmission of various messages and implementation of certain procedures to allow registration and maintenance of a wireless network connection with a multi-network communication device. Additionally, all such radio access technologies have varying levels of power consumption requirements. Multi-network communication devices should make use of available networks to optimize the user's experience. For portable devices, this optimization often involves trade-offs in performance to provide adequate battery operation. In a multi-network communication system where coverage overlap is common, the most efficient available communications mode should be selected to transmit the routine registration and maintenance messages. Embodiments of the present invention extend this paradigm by allowing the preferred network to act as a proxy for non-preferred networks in order to maintain connectivity, registration, and data traffic as desired.

Referring to FIG. 1, a multi-network wireless communication system is shown that is useful for understanding an embodiment of the present invention. The wireless communication system includes, but is not limited to, a multi-network terminal 101, transmission sites 112 and 122, and wireless networks 114 and 124. The multi-network terminal 101 connects to wireless networks 114 and 124 by communication with transmission sites 112 and 122 via wireless protocols 110 and 120, respectively. The wireless networks may be based on any radio access technology (RAT) and may be governed by any related wireless protocols.

In an exemplary embodiment, wireless network 114 is an LTE based network and the multi-network terminal 101 communicates with transmission site 112 through an appropriate 3GPP LTE protocol, i.e. LTE or LTE-A. In another aspect of this embodiment, wireless network 124 is a P25 based network and the multi-network terminal 101 communicates with transmission site 122 through an appropriate P25 protocol. In the illustrated embodiment, wireless network 114 is a preferred network and wireless network 124 is a secondary network. Because LTE is more battery efficient than P25 for the transmission of registration and connection maintenance procedure messages, an LTE network service is configured to operate as a proxy for the P25 network, relieving the less efficient network of registration, maintenance, provisioning, and network management tasks, and thereby conserving battery power. In this way, the wireless multi-network communication device preserves its battery for network specific P25 services, e.g. voice transmission. In this example embodiment, LTE and P25 networks are discussed, however, one skilled in the art will recognize that any two wireless network technologies may be substituted. In such alternate scenarios, the first network is configured to conduct routine data transmission of registration, maintenance, provisioning, and network management messages as a proxy for the second network.

Figure 2:
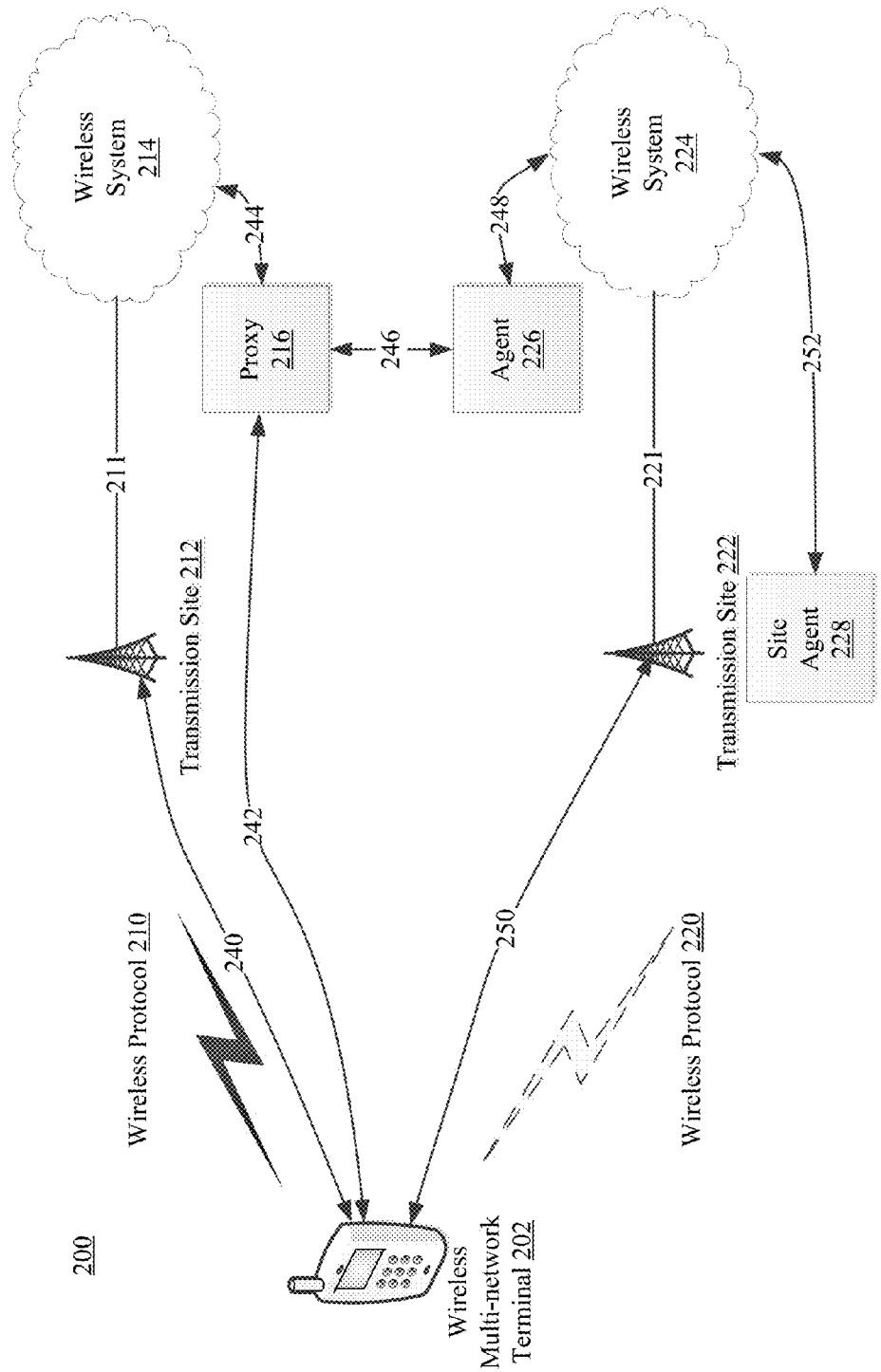
FIG. 2 is a diagram of a multi-network communication system that is useful for understanding the embodiments of the present invention.

Referring now to FIG. 2, a wireless multi-network system is shown that is useful for understanding embodiments of the present invention. The wireless multi-network system includes a wireless multi-network terminal 202. The wireless multi-network terminal 202 is capable of connection to various wireless radio access technologies including, but not limited to, those described above. In an embodiment, the wireless multi-network terminal 202 is capable of operating on an LTE based network and a P25 based network, for instance. The wireless multi-network terminal 202 utilizes wireless protocols 210 and 220 to communicate with transmission sites 212, 222 through wireless connections 240, 250 respectively. Transmission sites 212, 222 are connected to wireless network systems 214, 224 through connections 211, 221. Such connections can be wired, wireless, or fiber, dedicated backhaul connections that provide high throughput data transmission between transmission sites 212, 222 and the core networking system 214, 224. These connections can serve many wireless terminals at once, and the various network infrastructures that form wireless systems 214, 224.

Wireless multi-network terminal 202 can register with wireless systems 214, 224 through a registration procedure so that wireless multi-network terminal 202 can access services from wireless systems 214, 224 that require registration. Such registration procedures entail the exchange of various messages between the wireless multi-network terminal 202 and various components within and/or in communication with the network infrastructure of the wireless systems 214, 224. Each wireless protocol defines a particular content, format, and sequence of messages and defines where within the network hierarchy the messages are generated and/or processed. Registration procedures for the various wireless protocols and radio access technologies are well known in the art and will not be described in further detail.

In the illustrated embodiment, wireless multi-network terminal 202 registers with wireless system 214 via wireless connection 240. Various messages are exchanged, in accordance with the appropriate protocol specification, between wireless multi-network terminal 202, transmission site 212, and various infrastructure components of wireless system 214. Once registration with wireless system 214 is complete, wireless multi-network terminal 202 can communicate, in accordance with the user's subscription or registration status, with any portion of wireless system and receive any service over the established wireless data link. This includes a service over connection 242. Connection 242 can be wireless, wired, or virtual connection. A virtual connection traverses both the wired and wireless elements of the transport network and can encompass multiple nodes in wireless system 214. In an exemplary embodiment where wireless system 214 is an LTE or LTE-A network, connection 242 can be an LTE SGi interface. Additionally, wireless connection 242 can be an IP based connection.

The wireless system 214 includes and/or is in communication with a proxy component 216. In this exemplary embodiment the proxy component 216 is connected to the network infrastructure of wireless system 214 through connection 244 which can be wired, wireless, fiber, or virtual as described above in reference to connection 242. Proxy component 216 is configured to allow wireless network terminal 202 to register, via communication 242, with the proxy component 216 as a substitute for registering with wireless system 224. In other words, proxy component 216 operates as a intermediary for wireless system 224, thereby allowing wireless multi-network terminal 202 to transmit registration information via the network infrastructure of wireless system 214 instead of using the network infrastructure of wireless system 224. This is advantageous in cases where the registration procedures of wireless system 224 are particularly long, resource intensive, or where economic or communications goals of an enterprise are better served. For example, registration maintenance over a P25 network requires five to ten times the energy that an LTE network would require in performing a registration proxy service.

The proxy component 216 exchanges a series of messages with the wireless multi-network terminal 202, over connection 242 that was previously established. This series of messages provide the proxy component 216 with information required from wireless multi-network terminal 202 to allow for registration on wireless system 224. Preferably, the series of messages provides the proxy component with all information required for such registration on wireless system 224. This proxy registration is accomplished by transmitting control plane information for wireless system 224 to proxy component 216 via the data plane of wireless system 214. In other words, the control data that would otherwise be transmitted by the multi-network terminal 202 in control plane messages over wireless system 224 are instead transmitted to proxy component 216 in data plane messages over wireless system 214. In an embodiment, the control plain information for wireless system 224 can be sent using the data plane of internet protocol messages.

As mentioned above, proxy component 216 is a part of the network infrastructure of wireless system 214. After proxy component 216 receives the necessary control plane information from wireless multi-network terminal 202, a connection is established between wireless system 214 and wireless system 224. This connection can be any data connection. For example, the connection can be within the same core network or may be between different core networks, i.e. different service providers. Alternatively, the connection can be through a public network, such as the Internet. Additionally, the connection can be between wireless systems 214, 224 directly, between proxy component 216 and agent component 226, and/or any combination thereof. The embodiments of the present invention are not limited in this regard. The connection, shown in FIG. 2 as data connection 246, allows proxy component 216 to communicate with agent component 226. Agent component 226 is part of and/or in communication with the network infrastructure of wireless system 224 through connection 248 which can be similar to connection 244 above. Agent component 226 receives the data messages from proxy component 216 and extracts the control plane information that is used to register the wireless multi-network terminal 202 onto wireless system 224.

One of skill in the art will note that proxy may be implemented in a variety of ways and not depart form the scope of the present invention. In the exemplary embodiment described above, the proxy is a service component operating as a service in the first network. Alternatively, the proxy can be directly connected to the second network, provided that some direct or indirect transmission connection exists to allow communication between the multi-network terminal and the proxy component. In another alternative embodiment, the proxy component can be an intermediary node capable of maintaining communications with a plurality of networks. The embodiments of the present invention are not limited in this regard.

The wireless multi-network terminal 202 can include location and/or GPS data in the data messages exchanged with proxy component 216. Proxy component 216 can also receive location and cell data from the transmission site 212 and/or other components of wireless system 214. This location and cell data identifies the cell of wireless system 214 in which wireless multi-network terminal 202 currently resides. This information is packaged and transmitted by proxy component 216 to agent component 226 through data connection 246. Agent component 226 can then use this location data to determine the cell of wireless system 226 in which wireless multi-network terminal 202 currently resides. Agent component 226 can use other information, such as an up-to-date coverage maps of all relevant wireless systems and the like to determine the current cell.

The agent component 226 determines that the wireless multi-network terminal 202 is in the cell serviced by transmission site 222. Agent component 226 then transmits, through connection 252, the registration information to a site agent 228 that may be present at transmission site 222 or elsewhere in the infrastructure of wireless system 224. Site agent 228 caches or stores the registration information locally for use in registering the wireless multi-network terminal 202 onto wireless system 224.

Once the site agent 228 has the registration information cached, it can wait for an indication from the wireless multi-network terminal 202 that registration on wireless system 224 is desired. For example, the wireless multi-network terminal 202 transmits a very short message to the transmission site 222 over wireless protocol 220. Upon receipt of the very short message, the site agent will conduct the registration procedures, using the cached registration information, with wireless system 224. Alternatively, site agent 228 can initiate the registration procedures immediately upon receipt of the registration information from agent component 226. In either case, site agent 228 uses the cached registration information to conduct the registration procedure that wireless multi-network terminal 202 would otherwise be required to conduct over-the-air using wireless protocol 220. Upon completion of the registration, the required confirmation messages are exchanged with wireless multi-network terminal 202 and a communications link 250 is established with wireless system 224 through transmission site 222.

In an exemplary embodiment, wireless system 214 is an LTE network and wireless system 224 is a P25 network. Wireless multi-network terminal 202 includes P25 and LTE radios used in a mixed environment containing coverage for both technologies. LTE offers more services and higher throughput than P25. Consequently, an LTE network will be considered a preferred network over P25 to the extent it is capable of satisfying the bearer requirements of the desired service. This can be accomplished by conducting registration, provisioning, and network management services to the P25 client on the wireless multi-network terminal 202 over the LTE network. This minimizes activity by the P25 radio and thereby extends battery operation as a result of the much lower power requirements of LTE radios. The P25 radio is relieved from control plane communications by the proxy component 216 and is only required to periodically monitor signal quality to provide data for a potential handover to another P25 cell. The quality of the LTE signal, as well as GPS data may also aid in a handover decision. Since the site agent may only maintain a registration at the transmission site servicing the cell in which wireless multi-network terminal 202 currently resides, a handover will be required whenever wireless multi-network terminal 202 moves into a new cell. In much the same way as registration information, this connection maintenance information can also be transmitted through the LTE network, via proxy component 216 to register wireless multi-network terminal 202 with the site agent located at the transmission site servicing the new cell.

Although the exemplary embodiments described above in relation to FIG. 2 include two networks, one skilled in the art will recognize that the inventive concepts can be scaled to include any number of networks. For example, the multi-network terminal can be capable of connecting to an LTE network, a P25 network, a satellite network, and an IEEE 802.11 "wi-fi" network. Extending the exemplary example described above, the LTE network can be designated as the preferred network to handle control plane transmissions for the P25, satellite, and wi-fi networks through a proxy service operating on a node in communication with all four networks. The embodiments of the present invention are not limited in this regard.

Figure 3:
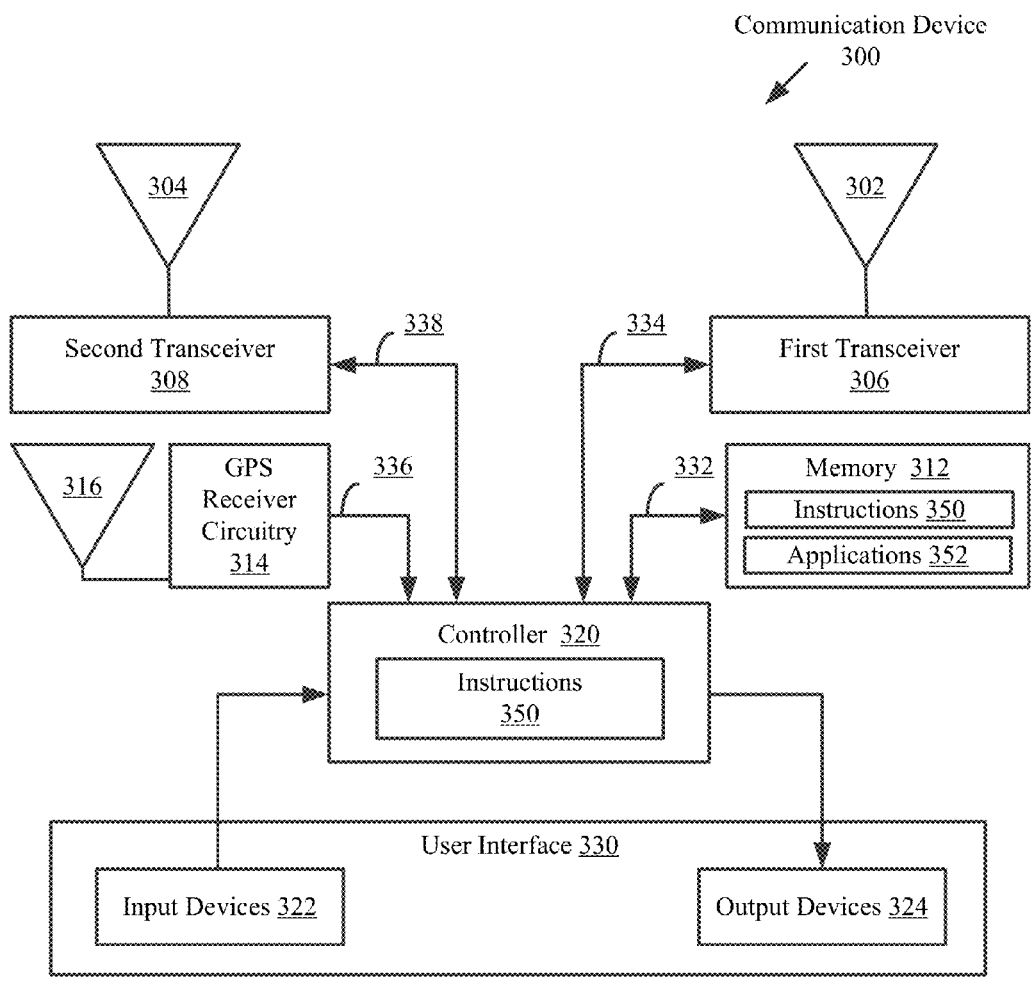
FIG. 3 is a block diagram of a multi-network terminal that is useful for understanding the embodiments of the present invention.

Referring now to FIG. 3, there is provided a more detailed block diagram of the communication device 300. The communication device 300 will be described herein as comprising any wireless multi-network terminal. For example, the communication device can alternatively comprise a land mobile radio ("LMR"), mobile/smart phone, personal computer ("PC"), notebook, a laptop computer, a PDA, a tablet, or other portable multi-network communication device.

Notably, the communication device 300 can include more or less components than those shown in FIG. 3. For example, the communication device 300 can include a wired system interface, such as a universal serial bus interface (not shown in FIG. 3). However, the components shown are sufficient to disclose an illustrative embodiment implementing the present invention. The hardware architecture of FIG. 3 represents one embodiment of a representative communication device configured to facilitate the registration and maintenance of the communication device with one or more networks through use of a proxy within and/or in communication with a preferred network.

As shown in FIG. 3, the communication device 300 comprises an antenna 302 coupled to a first transceiver 306 for receiving and transmitting a first set of Radio Frequency (RF) signals. The communication device 300 can include a second antenna 304 coupled to a second transceiver 308 for receiving and transmitting a second set of RF signals. One of skill in the art will recognize that multiple RF technologies may be able to utilize a single antenna and/or a single transceiver depending on the implementation. Additionally, one of ordinary skill in the art will recognize that transceivers 306, 308 may contain both receiver circuitry and transmitter circuitry. The transceivers 306, 308 demodulate and decode the RF signals received from a network (e.g., wireless systems 214, 224 of FIG. 2) to derive information therefrom. The transceivers 306, 308 are coupled to a controller 310 via the electrical connections 334, 338. The transceivers 306, 308 provide the decoded RF signal information to the controller 310. The controller 310 uses the decoded RF signal information in accordance with the function(s) of the communication device 300. The controller 310 also provides information to the transceivers 306, 308 for encoding and modulating information into RF signals. The transceivers 306, 308 communicate the RF signals to the antenna 302, 304 for transmission to an external device (e.g., transmission site 212, 222 of FIG. 2). As discussed above, the multi-network terminal may be connected to any number of networks. Therefore the multi-network terminal may include any number of transceivers, each configured to communicate with a particular network. The embodiments of the present invention are not limited in this regard.

An antenna 316 is coupled to GPS receiver circuitry 314 for receiving GPS signals. The GPS receiver circuitry 314 demodulates and decodes the GPS signals to extract GPS location information therefrom. The GPS location information indicates the location of the communication device 300. The GPS receiver circuitry 314 provides the decoded GPS location information to the controller 310. As such, the GPS receiver circuitry 314 is coupled to the controller 310 via an electrical connection 336. Notably, the present invention is not limited to GPS based methods for determining a location of the communication device 300. Other methods for determining a location of a communication device can be used with the present invention without limitation.

The controller 310 stores the decoded RF signal information and the decoded GPS location information in a memory 312 of the communication device 300. Accordingly, the memory 312 is connected to and accessible by the controller 310 through an electrical connection 332. The memory 312 can be a volatile memory and/or a non-volatile memory. For example, the memory 312 can include, but is not limited to, a Random Access Memory (RAM), a Dynamic Random Access Memory (DRAM), a Static Random Access Memory (SRAM), Read-Only Memory (ROM) and flash memory. The memory 312 can also have stored therein instructions 350 and software applications 352.

The software applications 352 include, but are not limited to, applications operative to provide telephone services, network communication services, GPS based services, navigation services, location services, position reporting services, traffic status services, operational information services, commerce services, email services, web based services, and/or electronic calendar services. As shown in FIG. 3, one or more sets of instructions 350 are also stored in the memory 312. The instructions 350 can also reside, completely or at least partially, within the controller 320 during execution thereof by the communication device 300. In this regard, the memory 312 and the controller 320 can constitute machine-readable media. The term "machine-readable media", as used here, refers to a single medium or multiple media that store the one or more sets of instructions 350. The term "machine-readable media", as used here, also refers to any medium that is capable of storing, encoding or carrying the set of instructions 350 for execution by the communication device 300 and that cause the communication device 300 to perform one or more of the methodologies of the present disclosure.

The controller 320 is also connected to a user interface 330. The user interface 330 is comprised of input devices 322, output devices 324, and software routines (not shown in FIG. 3) configured to allow a user to interact with and control software applications 352 installed on the computing device 300. Such input and output devices may include any input/output device which is now known or known in the future. The invention is not limited in this regard.

Figure 4:
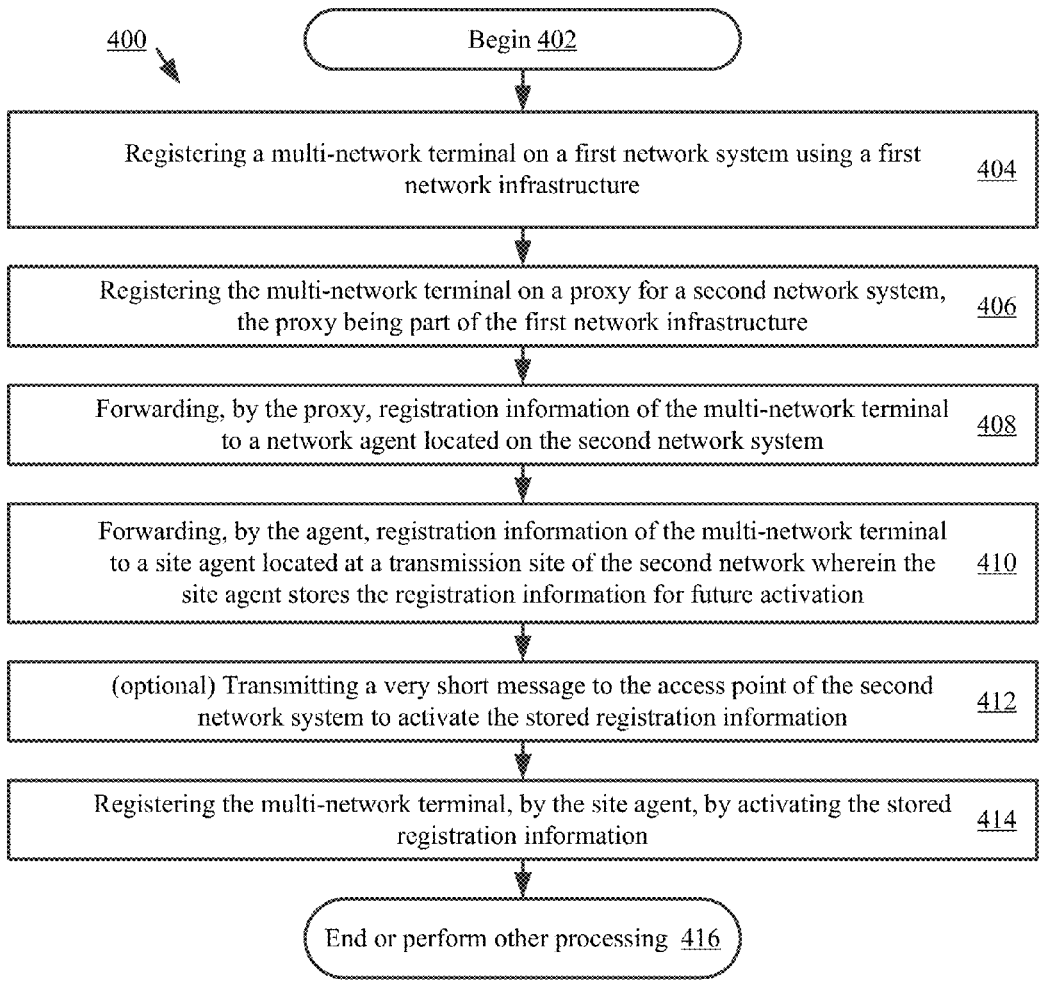
FIG. 4 is a flowchart that is useful for understanding a process for registering a multi-network terminal on multiple networks using a proxy.

Referring now to FIG. 4, there is provided a flowchart which summarizes an embodiment of the present invention. The process begins with step 402 and continues to step 404 where a multi-network terminal is registered on a first network using a first network infrastructure (e.g., wireless protocol 210, transmission site 212, and connection 240), in accordance with the appropriate procedures for that network.

In step 406, the multi-network terminal then transmits registration information for a second network to a proxy component that is part of the first network infrastructure. For example, the multi-network terminal can send control plane information required to establish a connection between the multi-network terminal and the second network to the proxy component using the data plane of the first network, e.g. through a client configured to register on the second network using the network infrastructure of the first network. In this embodiment, a series of messages is exchanged between the multi-network terminal (i.e. a client application running on the multi-network terminal) and the proxy component. The proxy component effectively reproduces the registration procedure that would otherwise occur using the network infrastructure of the second network. As noted above, it can be advantageous to avoid utilizing the network infrastructure of the second network to transmit routine connection registration and network attachment messages, e.g. in situations when transmitting over a second network requires high levels of power consumption in comparison to transmitting over the first network, in conditions where the grade of service of one network may be degraded by transmitting over the second, or in situations where enterprise goals such as network use cost are involved.

In step 408, the proxy component forwards the registration information received from the multi-network terminal in step 406 to an agent component that is part of the network infrastructure of the second network. This transmission between the first and second networks is performed through any data connection medium now known or known in the future. The embodiments of the present invention are not limited in this regard.

The agent component can extract location information from the registration information sent from the proxy component to determine in which cell of the second network the multi-network terminal currently resides. For example, the multi-network terminal can include GPS or other location information with the messages carrying the registration information to establish the current geographic location of the multi-network terminal. Alternatively, the first network can record the location of the transmission site currently servicing the multi-network terminal. Using coverage maps of the first and second networks, the agent component can determine the current cell of the second network that contains the multi-network terminal. Any method of obtaining the location of the multi-network terminal can be utilized. Embodiments of the present invention are not limited in this regard.

In step 410, once the agent component determines which cell of the second network the multi-network terminal is currently in, the agent component forwards the registration information. Specifically, the registration information is forwarded to a site agent located at the transmission site currently servicing the cell that includes the multi-network terminal. The site agent then stores the registration information in a cache or memory for retrieval when needed. If the multi-network terminal requires registration on the second network immediately, the process continues in step 414. If, however, the multi-network terminal does not require immediate registration, the process can optionally continue to step 412.

In optional step 412, the multi-network terminal can transmit a message to cause the site agent to initiate the registration procedures for the second network. For example, after the multi-network terminal sends a message or group of messages containing the registration information to the agent component, the multi-network terminal may wait until use of the second network is required before completing the registration on that network. In this example, the site agent can send, during the registration process, a short unique identifier to the multi-network terminal. This unique identifier can be used to complete the registration when the multi-network terminal requires service from the second network. The registration can be completed after the multi-network terminal transmits a very short message (VSM), i.e. a data message that may only contain a few bytes, to the transmission site connected to the second network. In this example, the VSM includes the short unique identifier for the multi-network terminal. When the site agent receives the VSM over the second network, the process continues to step 414.

In step 414, the site agent initiates registration procedures using the cached registration information. Once confirmation messages are exchanged with the multi-network terminal, the connection is established with the second network (i.e. connection 250 of FIG. 2) and the multi-network terminal can begin receiving registered services over the second network.

Alternatively, the method can proceed to step 414 immediately after step 410, i.e. the site agent can initiate registration procedures to register the multi-network terminal on the second network immediately upon receipt of the registration information from the agent component. In step 416, after the multi-network terminal is registered on the second network, the method ends or other processing is performed.

By utilizing the network infrastructure of a preferred network, readiness is maintained on a more resource intensive secondary network by utilizing a less resource intensive network. Connection maintenance messaging between the multi-network terminal and the second network is normally transmitted via control plane signaling using the appropriate protocol of the second network. This control plane information transmission can alternatively be conducted using the network infrastructure of the first network. In other words, control plane transmissions for the second network are transmitted over the data plane or control plane of the first network. For example, the second network can require that acknowledgements to periodic polling messages be received from the multi-network terminal in order to maintain their connections. If the multi-network terminal does not acknowledge a polling message, the connection registration for that multi-network terminal would be discarded and the connection be discontinued. At this point, the multi-network terminal would be required to register with the second network again. In this example, the first network, operating as a preferred network, could carry this control plane signaling to the second network through the proxy in much the same way as the registration information as described above.

Figure 5:
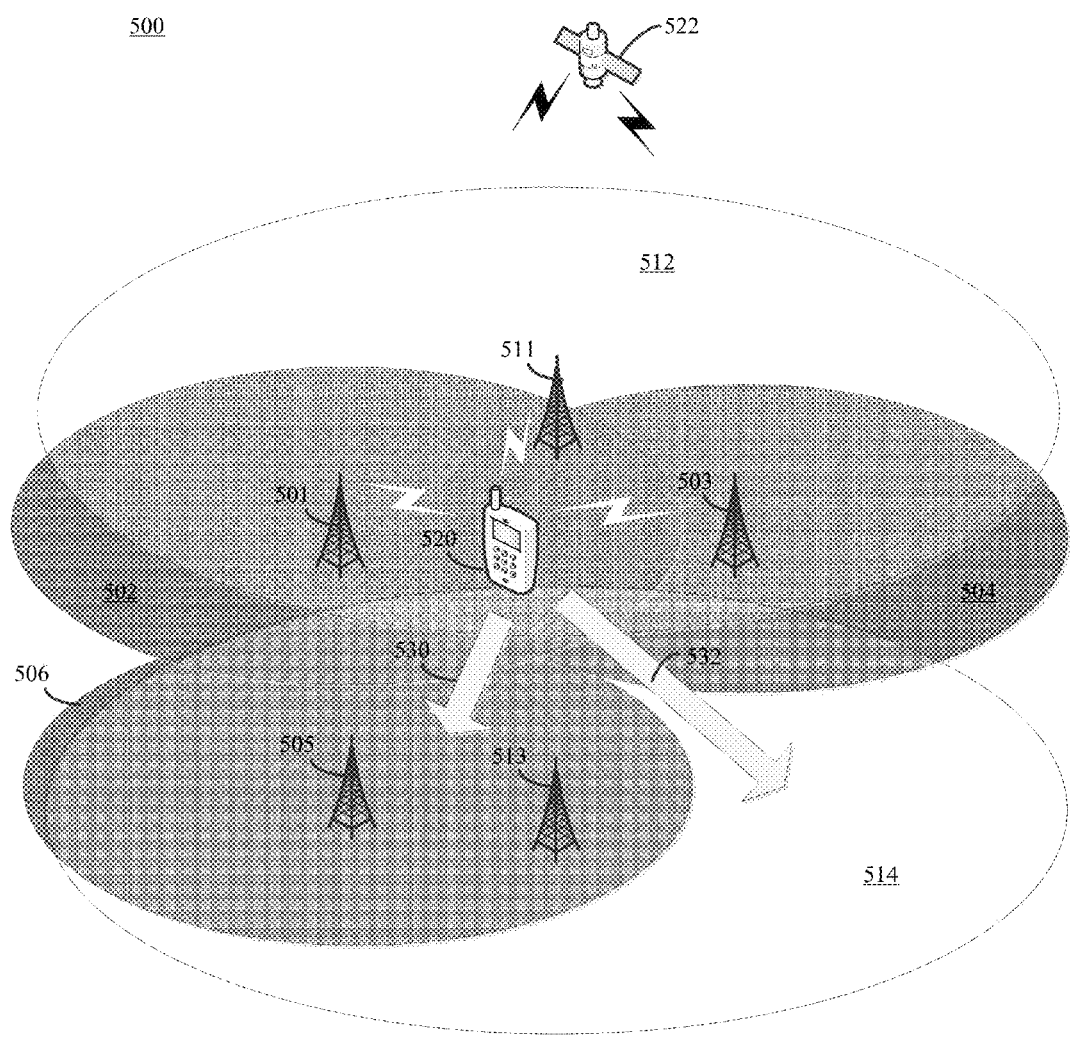
FIG. 5 is a diagram of a physical topology of a wireless communications network that is useful for understanding embodiments of the present invention.

Referring to FIG. 5, a diagram is provided of a multi-network topology of a multi-network system 500 that is helpful for understanding the embodiments of the present invention. Multi-network system 500 includes transmission sites 501, 503, 505 that are servicing cells 502, 504, 506. In this embodiment, these transmission sites and associated cells 501-506 are associated with a preferred network. Also included in multi-network system 500 are transmission sites 511, 513 and associated cells 512, 514. These transmission sites and associated cells 511-514 are associated with a secondary network. Multi-network system 500 also includes multi-network terminal 520 and satellite 522, which can provide GPS services to the multi-network terminal 520 and/or the transmission sites and other network components. While FIG. 5 illustrates the cells of the preferred network as smaller than the cells of the secondary network, one of skill in the art will recognize that this is not required. The embodiments of the present invention are not limited in this regard.

In the illustrated embodiment, multi-network terminal 520 has engaged in the process described above to register on the secondary network using the network infrastructure of the preferred network. For example, transmission sites 501 and 511 are respectively similar to transmission sites 212 and 222, of FIG. 2, in that the multi-network terminal 520 registered on the preferred network using transmission site 501 and exchanged registration information with a proxy component in the preferred network and an agent component in the secondary network (not shown in FIG. 5). Additionally, site agent 228 of FIG. 2 is within and/or in communication with the infrastructure of wireless system 224 and associated with transmission site 511 of FIG. 5, for example. In the embodiment illustrated in FIG. 5, therefore, the agent component determined that the multi-network terminal 520 is located in cell 512 which is serviced by transmission site 511. The agent component transmitted the registration information to the site agent located at transmission site 511 to register the multi-network terminal 520 onto the secondary network.

As discussed above, the secondary network preferably has access to information regarding which cell the multi-network terminal 520 is in so that registration can be completed and a connection established. Another embodiment of the present invention aids in maintaining a connection to the secondary network when the multi-network terminal 520 moves into another cell of the secondary network. Although many of the control plane communications between the multi-network terminal 520 and the secondary network are transmitted through the infrastructure of the preferred network, the multi-network terminal 520 will preferably still monitor the signal quality of the secondary network to determine if a handover in the secondary network must be conducted. Signal quality can be measured using signal quality metrics through methods well known in the art. Referring again to FIG. 5, two such situations are illustrated. Multi-network terminal 520, currently registered at transmission site 511 and the associated cell 512, may move in a direction 530. As multi-network terminal 520 moves along direction 530 a handover in the secondary network will be required. The handover in the preferred network can occur according to the appropriate handover procedures for that network, but the preferred network connection can also be maintained while the secondary network proceeds with a handover.

When the multi-network terminal 520 moves from cell 512 to cell 514, it must handoff to the new cell in the secondary network. If the handoff does not occur, the secondary network will continue to poll for the multi-network terminal in cell 512. Since multi-network terminal 520 is no longer in cell 512, it will not be able to acknowledge the polling messages and the connection will be discarded. As with initial registration, handover to a new cell in the secondary network may also be assisted through use of the network infrastructure of the preferred network.

Readiness and maintenance of the connection to the secondary network is important in situations where the multi-network terminal 520 is moving out of range of the preferred network. This situation is illustrated in FIG. 5 where the multi-network terminal 520 is shown as moving in direction 532. When the multi-network terminal 520 moves along direction 532, it will eventually be in a portion of cell 514 were there is no coverage for the preferred network. For example, the multi-network terminal 520 may monitor the signal quality of the preferred network combined with GPS signals (e.g. from satellite 522). Accordingly, knowledge of the coverage and physical topology of the preferred network can be used to determine when a handoff to the secondary network should be made. By maintaining the connection with the secondary network, a very quick change over to the secondary network is possible with very little if any loss in communications capabilities. When the services and resources of the first network are no longer available, the multi-network terminal 520 is not required to engage in a potentially lengthy and power intensive registration process, but may simply and dynamically switch the operating mode of the multi-network terminal to operate entirely on the secondary network.

Figure 6:
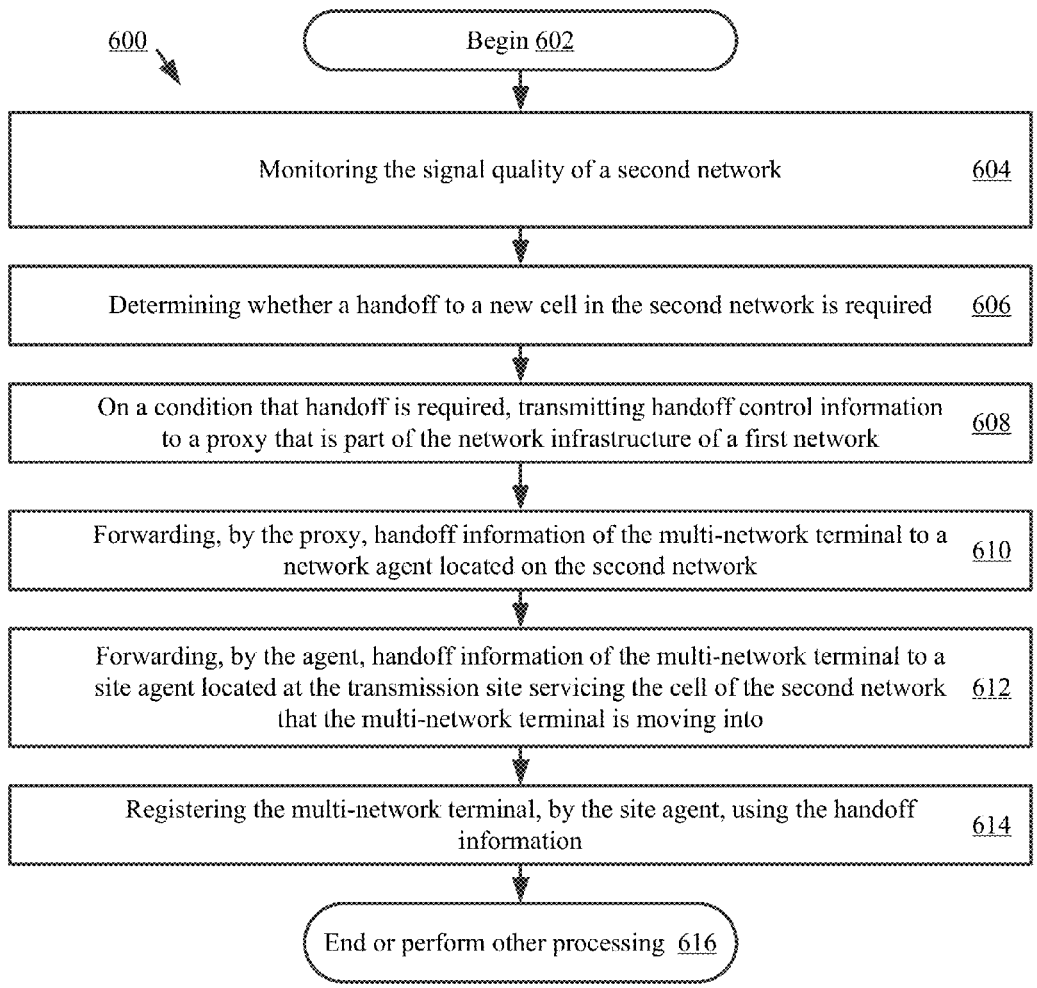
FIG. 6 is a flowchart that is useful for understand a process for maintain a data connection with a multi-network terminal using a proxy.

Referring now to FIG. 6, there is provided a flow chart which summarizes a methodology for using a proxy to aid in handover to another cell in a secondary network. The method begins in step 602 and continues to step 604 where the multi-network terminal, with active connections to a first and a second network, monitors the signal quality of a second network. As described above, signal quality can be measured using signal quality metrics through methods well known in the art. When the signal quality of the secondary network falls below some predetermined amount, in accordance with the protocol of the second network, the multi-network terminal is required to handover to a new cell of the second network. In step 606, the multi-network terminal makes a determination whether handoff to a new cell is required. If handoff to a new cell is required, the method continues to step 608 where the multi-network terminal transmits handoff control plane information to effect a handoff in the second network through the network infrastructure of a first network to a proxy component. In step 610, the proxy component forwards the handoff information to an agent component that is part of the network infrastructure of the second network. In step 612, the agent component forwards the handoff information to a site agent located within and/or in communication with the infrastructure of the second network In step 614, the site agent conducts the handoff procedures to handoff the multi-network terminal to the new cell in the second network using the handoff information transmitted through the network infrastructure of the first network. In step 616, the method ends or other processing is performed.

While various embodiments of the present invention have been described above, it should be understood that they have been presented by way of example only, and not limitation. Numerous changes to the disclosed embodiments can be made in accordance with the disclosure herein without departing from the spirit or scope of the invention. The scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for use in a wireless multi-network terminal registered on a first network comprising a first network infrastructure, the method comprising:

performing operations by said wireless multi-network terminal to register with said first network via a first connection;

transmitting, by said wireless multi-network terminal, registration information over a second connection to a proxy component that is in communication with said first network infrastructure, where said registration information is required for said wireless multi-network terminal's registration with a second network different from the first network, forwarded by said proxy component to an agent component, that is part of said second network comprising a second network infrastructure different from the first network infrastructure, over a first data connection established between the first and second networks, forwarded by the agent component to a site agent located within the second network infrastructure of the second network, and used by the site agent to conduct registration procedures for registering the multi-network terminal with the second network; and receiving, by said wireless multi-network terminal, a registered service over a second data connection established between the wireless multi-network terminal and said second network upon completion of said registration procedures;

wherein said registration information is control plane information and is transmitted over the first network infrastructure using data plane messages which are facilitated by data plane functions also used for transmitting user data traffic in said first network, said data plane functions supported by control plane functions used for establishing and managing data connections of said first network over which said user data traffic is transferred.

2. The method of claim 1, further comprising:

monitoring, by said wireless multi-network terminal, signal quality metrics of said first network;

on a condition that said signal strength of said first network is below a predetermined threshold, handing off, by the wireless multi-network terminal, to said second network using said data connection that was established based on said registration information that was transmitted to said first network infrastructure.

3. The method of claim 1, wherein said wireless multi-network terminal is registered on both said first and said second networks, the method further comprising:

monitoring, by said wireless multi-network terminal, signal quality metrics of said second network;

determining, by said wireless multi-network terminal, whether a handoff to a new cell of said second network is required based on said signal quality metrics of said second network;

on a condition that said handoff is required, transmitting, by said wireless multi-network terminal, handoff information to said proxy component through said first network infrastructure; and receiving, by said wireless multi-network terminal, a handoff confirmation message from said new cell of said second network based on said handoff information transmitted to said first network infrastructure.

4. A method for use in a wireless multi-network terminal registered on a first network comprising a first network infrastructure, the method comprising:

performing operations by said wireless multi-network terminal to register with said first network via a first connection;

transmitting, by said wireless multi-network terminal, registration information over a second connection to a proxy component that is in communication with said first network infrastructure, wherein said registration information is required for said wireless multi-network terminal's registration with a second network and is forwarded by said proxy component to an agent component that is part of said second network comprising a second network infrastructure; and receiving, by said wireless multi-network terminal, a registered service over a data connection established with said second network based on said registration information that was transmitted to said first network infrastructure;

wherein said registration information is control plane information and is transmitted using data plane messages which are facilitated by data plane functions also used for transmitting user data traffic in said first network, said data plane functions supported by control plane functions used for establishing and managing data connections of said first network over which said user data traffic is transferred;

wherein said forwarding of said registration information to said agent component causes said agent component to forward said registration information to a site agent located at a transmission site within said second network infrastructure, said method further comprising:

receiving, by said wireless multi-network terminal, a confirmation message confirming a registration of said wireless multi-network terminal on said second network, wherein said registration is executed by said site agent using said registration information that was transmitted to said first network infrastructure.

5. The method of claim 4, further comprising:

generating, by said wireless multi-network terminal, a message that includes a unique identifier for said wireless multi-network terminal; and before receiving said registered service, transmitting, by said wireless multi-network terminal, said message to said second network, wherein said receiving said registered service from said second network is in response to said message.

6. The method of claim 4, wherein said registration information transmitted to said first network infrastructure includes location information used by said agent component to determine a cell of a plurality of cells said wireless multi-network terminal is currently located in, and wherein said cell is serviced by said transmission site.

7. A method for use in a wireless multi-network terminal registered on a first network comprising a first network infrastructure, the method comprising:

performing operations by said wireless multi-network terminal to register with said first network via a first connection;

transmitting, by said wireless multi-network terminal, registration information over a second connection to a proxy component that is in communication with said first network infrastructure, wherein said registration information is required for said wireless multi-network terminal's registration with a second network and is forwarded by said proxy component to an agent component that is part of said second network comprising a second network infrastructure; and receiving, by said wireless multi-network terminal, a registered service over a data connection established with said second network based on said registration information that was transmitted to said first network infrastructure;

wherein said registration information is control plane information and is transmitted using data plane messages which are facilitated by data plane functions also used for transmitting user data traffic in said first network, said data plane functions supported by control plane functions used for establishing and managing data connections of said first network over which said user data traffic is transferred;

wherein said wireless multi-network terminal is registered on both said first and said second networks, the method further comprising:

monitoring, by said wireless multi-network terminal, signal quality metrics of said second network;

determining, by said wireless multi-network terminal, whether a handoff to a new cell of said second network is required based on said signal quality metrics of said second network;

on a condition that said handoff is required, transmitting, by said wireless multi-network terminal, handoff information to said proxy component through said first network infrastructure; and receiving, by said wireless multi-network terminal, a handoff confirmation message from said new cell of said second network based on said handoff information transmitted to said first network infrastructure; and wherein said registration information and said handoff information comprises control plane messages used by said second network to establish a data connection.

8. The method of claim 7, wherein said registration information and said handoff information is transmitted using data plane messages of said first network.

9. A wireless multi-network terminal configured to communicate with a plurality of networks, comprising:

a controller registering with a first network of the plurality of networks via a first connection, and generating registration messages compatible with the first network, wherein said registration messages include registration information that is required for said wireless multi-network terminal's registration with a second network different from the first network of said plurality of networks;

a transmitter circuitry transmitting said registration messages over a second connection to a proxy component that is in communication with a network infrastructure that comprises said first network, wherein said registration messages cause said proxy component to forward said registration information to an agent component that is part of a second network infrastructure different from the first network infrastructure, over a first data connection established between the first and second networks; and a receiver circuitry receiving a registered service over a second data connection established between the wireless multi-network terminal and said second network upon completion of a registration procedures conducted by the agent for registering the multi-network terminal with the second network;

wherein said registration information is control plane information and is transmitted over the first network infrastructure using data plane messages which are facilitated by data plane functions also used for transmitting user data traffic in said first network, said data plane functions supported by control plane functions used for establishing and managing data connections of said first network over which said user data traffic is transferred.

10. The wireless multi-network terminal of claim 9, where said multi-network terminal is registered on said first and said second networks, further comprising:

circuitry monitoring signal quality metrics of said first network;
wherein said controller further hands off to said second network, on a condition that said signal quality metrics of said first network is below a predetermined threshold, using said data connection that was established based on said registration information that was transmitted to said first network infrastructure.

11. The wireless multi-network terminal of claim 9, wherein said wireless multi-network terminal is registered on said first and said second networks, further comprising:
circuitry monitoring a signal quality metrics of said second network,
wherein said controller further determines whether a handoff to a new cell of said second network is required based on said signal quality metrics of said second network and generates handoff messages compatible with said first network, wherein said messages include handoff information for use with said second network,
wherein said transmitter circuitry further transmits, on a condition that said handoff is required, said handoff messages to said proxy component through said first network infrastructure, and wherein said receiver circuitry further receives a handoff confirmation message from said new cell of said second network based on said handoff information transmitted to said first network infrastructure.

12. A wireless multi-network terminal configured to communicate with a plurality of networks, comprising:
a controller registering with a first network of the plurality of networks via a first connection, and generating registration messages compatible with the first network, wherein said registration messages include registration information that is required for said wireless multi-network terminal's registration with a second network of said plurality of networks;
a transmitter circuitry transmitting said registration messages over a second connection to a proxy component that is in communication with a network infrastructure that comprises said first network, wherein said registration messages cause said proxy component to forward said registration information to an agent component that is part of a second network infrastructure that comprises said second network; and
a receiver circuitry receiving a registered service over a data connection established with said second network based on said registration information that was transmitted to said first network infrastructure;
wherein said registration information is control plane information and is transmitted using data plane messages which are facilitated by data plane functions also used for transmitting user data traffic in said first network, said data plane functions supported by control plane functions used for establishing and managing data connections of said first network over which said user data traffic is transferred; and
wherein said forwarding of said registration information to said agent component causes said agent component to forward said registration information to a site agent located at a transmission site within said second network infrastructure, and wherein said receiver circuitry further receives a confirmation message confirming a registration of said wireless multi-network terminal on said second network, wherein said registration is executed by said site agent using said registration information that was transmitted to said first network infrastructure.

13. The wireless multi-network terminal of claim 12, wherein said receiver circuitry further receives a first message that includes a pseudorandomly generated number from said site agent through said proxy component, wherein said controller further generates a second message based on said first message, and wherein said transmitter circuitry further transmits said second message to said second network, wherein receiving said registered service from said second network is in response to said second message.

14. A wireless multi-network terminal configured to communicate with a plurality of networks, comprising:
a controller registering with a first network of the plurality of networks via a first connection, and generating registration messages compatible with the first network, wherein said registration messages include registration information that is required for said wireless multi-network terminal's registration with a second network of said plurality of networks;
a transmitter circuitry transmitting said registration messages over a second connection to a proxy component that is in communication with a network infrastructure that comprises said first network, wherein said registration messages cause said proxy component to forward said registration information to an agent component that is part of a second network infrastructure that comprises said second network; and
a receiver circuitry receiving a registered service over a data connection established with said second network based on said registration information that was transmitted to said first network infrastructure;
wherein said registration information is control plane information and is transmitted using data plane messages which are facilitated by data plane functions also used for transmitting user data traffic in said first network, said data plane functions supported by control plane functions used for establishing and managing data connections of said first network over which said user data traffic is transferred;
wherein said wireless multi-network terminal is registered on said first and said second networks, and circuitry monitoring is performed based on signal quality metrics of said second network;
wherein said controller further determines whether a handoff to a new cell of said second network is required based on said signal quality metrics of said second network and generates handoff messages compatible with said first network, wherein said messages include handoff information for use with said second network;
wherein said transmitter circuitry further transmits, on a condition that said handoff is required, said handoff messages to said proxy component through said first network infrastructure, and wherein said receiver circuitry further receives a handoff confirmation message from said new cell of said second network based on said handoff information transmitted to said first network infrastructure; and
wherein said registration information and said handoff information comprises control plane messages used by said second network to establish a data connection.

15. The wireless multi-network terminal of claim 14, wherein said registration information and said handoff information is transmitted using data plane messages of said first network.

16. A method for use in a multi-network wireless communication system, the method comprising:
registering a wireless multi-network terminal on a first network using a first network infrastructure;

registering said wireless multi-network terminal on a proxy component that is in communication with said first network infrastructure, wherein said proxy component receives registration information included in data plane messages and which is required for said wireless multi-network terminal's registration with a second network different from the first network, said data plane messages are facilitated by data plane functions used for transmitting user data traffic in said first network, said data plane functions supported by control plane functions used for establishing and managing data connections of said first network over which said user data traffic is transferred;

forwarding, by said proxy component, said registration information to an agent component that is part of the second network comprising a second network infrastructure different from the first network infrastructure, over a first data connection established between the first and second networks;

forwarding, by said agent component, said registration information of said wireless multi-network terminal to a site agent located at a transmission site within said second network infrastructure; and using by the site agent to conduct registration procedures for registering said wireless multi-network terminal with said second network;

wherein said registration information is control plane information and is transmitted using data plane message which are facilitated by data plane functions also used for transmitting user data traffic in said first network, said data plane functions supported.

17. The method of claim 16, wherein said registration information transmitted to said first network infrastructure includes location information used by said agent component to determine a cell of a plurality of cells said wireless multi-network terminal is currently located in, and wherein said cell is serviced by said transmission site.

18. The method of claim 16, wherein said registering said wireless multi-network terminal establishes a data connection between said wireless network terminal and said second network, the method further comprising:

monitoring, by said wireless multi-network terminal, signal quality metrics of said first network;

on a condition that said signal quality metrics of said first network is below a predetermined threshold, handing off, by said wireless multi-network terminal, to said second network using said data connection that was established based on said registration information that was transmitted to said first network infrastructure.

19. The method of claim 16, further comprising:

monitoring, by said wireless multi-network terminal, signal quality metrics of said second network;

determining, by said wireless multi-network terminal, whether a handoff to a new cell of said second network is required based on said signal quality metrics of said second network;

on a condition that said handoff is required, transmitting, by said wireless multi-network terminal, handoff information to said proxy component through said first network infrastructure;

forwarding, by said proxy component, said handoff information to said agent component;

forwarding, by said agent component, said handoff information to a site agent servicing said new cell of said second network; and handing off said wireless multi-network terminal to said new cell of said second network, by said site agent, based on said handoff information transmitted to said first network infrastructure.

20. A method for use in a multi-network wireless communication system, the method comprising:

registering a wireless multi-network terminal on a first network using a first network infrastructure;

registering said wireless multi-network terminal on a proxy component that is in communication with said first network infrastructure, wherein said proxy component receives registration information included in data plane messages and which is required for said wireless multi-network terminal's registration with a second network, said data plane messages are facilitated by data plane functions used for transmitting user data traffic in said first network, said data plane functions supported by control plane functions used for establishing and managing data connections of said first network over which said user data traffic is transferred;

forwarding, by said proxy component, said registration information to an agent component that is part of a second network infrastructure;

forwarding, by said agent component, said registration information of said wireless multi-network terminal to a site agent located at a transmission site within said second network infrastructure;

registering said wireless multi-network terminal, by the site agent, on said second network by using said registration information forwarded from the first network infrastructure;

generating, by said wireless multi-network terminal, a message that includes a unique identifier for said wireless multi-network terminal; and transmitting, by said wireless multi-network terminal, said message to the second network using said second network infrastructure, wherein said registering of said wireless multi-network terminal by said site agent is in response to said message;

wherein said registration information is control plane information and is transmitted using data plane message which are facilitated by data plane functions also used for transmitting user data traffic in said first network, said data plane functions supported.

* * * * *